United States Patent [19]
Shirato

[11] Patent Number: 5,333,350
[45] Date of Patent: Aug. 2, 1994

[54] UNIDIRECTIONAL WIPER APPARATUS FOR A VEHICLE

[75] Inventor: Masayoshi Shirato, Kiryu, Japan

[73] Assignee: Mitsuba Electric Manufacturing Co., Ltd., Kiryu, Japan

[21] Appl. No.: 29,223

[22] Filed: Mar. 10, 1993

[30] Foreign Application Priority Data

Mar. 10, 1992 [JP] Japan .................................. 4-086376

[51] Int. Cl.⁵ .............................. B60S 1/36; B60S 1/34
[52] U.S. Cl. ........................... 15/250.21; 15/250.35; 15/250.22; 15/250.13; 318/DIG. 2
[58] Field of Search .......... 15/250.21, 250.23, 250.35, 15/250.12, 250.13, 250.17, 250.30, 250.22; 310/DIG. 2

[56] References Cited

U.S. PATENT DOCUMENTS

| | | |
|---|---|---|
| 4,418,440 | 12/1983 | Sigety, Jr. |
| 4,431,954 | 2/1984 | Carpenter et al. ................ 15/250.13 |
| 4,665,488 | 5/1987 | Graham et al. .................. 15/250.13 |

FOREIGN PATENT DOCUMENTS

| | | |
|---|---|---|
| 0251503 | 7/1988 | European Pat. Off. |
| 0223390 | 10/1988 | European Pat. Off. |
| 2640919 | 3/1978 | Fed. Rep. of Germany |
| 1348890 | 3/1974 | United Kingdom |

Primary Examiner—Timothy F. Simone
Assistant Examiner—Gary K. Graham
Attorney, Agent, or Firm—Oliff & Berridge

[57] ABSTRACT

A wiper apparatus having a non-reversing wiper blade includes: a slide bar having a wiper blade attached thereon; a housing for slidably supporting the slide bar in a lengthwise direction of the slide bar, the slide bar having two longitudinally opposed end of travel positions which define wiping positions of the wiper blade; a wiper motor for unidirectionally rotating the housing; and an actuating motor for forcibly sliding the slide bar to bring the wiper blade to the wiping positions.

8 Claims, 9 Drawing Sheets

101 — START

102 — INITIAL SETTING

103 — ROTATION ANGLE OF BLADE IS AT WIPING START POSITION ?

104 — DRIVE WIPER MOTOR 2 TO BRING BLADE TO WIPING START POSITION

105 — DISPLACED POSITION OF BLADE IS AT ONE OF TRAVEL END POSITIONS ?

106 — DRIVE ACTUATING MOTOR 7 TO BRING BLADE TO ONE OF TRAVEL END POSITIONS

107 — WIPER SWITCH 10 IS TURNED ON ?

108 — DRIVE WIPER MOTOR 2 BASED ON SET SPEED

109 — BLADE IS WITHIN WIPING ROTATION RANGE ?

110 — CALCULATE SET DISPLACEMENT POSITION FROM ROTATION ANGLE OF BLADE

111 — DETECTION VALUE OF DISPLACED POSITION OF BLADE IS AT SET DISPLACEMENT POSITION

112 — SLOW DOWN OR STOP WIPER MOTOR 2

113 — DRIVE ACTUATING MOTOR 7 TO CAUSE BLADE TO MOVE TOWARD OPPOSITE TRAVEL END POSITION

114 — BLADE AT OPPOSITE TRAVEL END POSITION ?

115 — STOP ACTUATING MOTOR 7

116 — DRIVE ACTUATING MOTOR 7 TO BRING DISPLACED POSITION OF BLADE TO SET DISPLACEMENT POSITION

117 — STOP ACTUATING MOTOR 7

FIG. 2A

UNIDIRECTIONAL WIPER APPARATUS FOR A VEHICLE

BACKGROUND OF THE INVENTION

1. Field of the Invention

The present invention relates to a wiper apparatus which is mounted, for example, on such vehicles as a passenger car, bus or truck and a method of wiping a windshield of a vehicle.

2. Description of the Related Art

Such vehicles are usually provided with wiper apparatuses for wiping their windshield surfaces. A conventional wiper apparatus is constructed so that its wiper arm is oscillated in a reciprocating manner. Since the direction of travel of the wiper arm is reversed at each end of travel thereof, there has been a problem that the impact and the sound of reversing at the time of such reversing cannot possibly be eliminated.

SUMMARY OF THE INVENTION

Accordingly, the present invention provides an apparatus and method capable of eliminating these problems. A wiper apparatus for a windshield of a vehicle according to a first aspect of the present invention comprises: a slide bar having a wiper blade integrally formed thereon; a housing for supporting the slide bar slidably in a longitudinal direction thereof where each of two longitudinally opposed end of travel positions of the slide bar defines a wiping position of the wiper blade; a blade rotating motor provided on the housing to unidirectionally rotate the housing; a blade moving motor for forcibly sliding the slide bar to bring the wiper blade to the wiping position; a rotation angle detection means for detecting a wiping rotation angle of the wiper blade; a displacement position detection means for detecting a displacement position of the wiper blade in a longitudinal direction thereof; and a drive control unit connected to the rotation angle detection means and the displacement position detection means to output a drive control command to each of the motors on the basis of detection signals from the detection means; wherein the drive control unit has a displacement control means for sliding the slide bar to an opposite end of travel position by providing a drive command to the blade moving motor upon detection that the wiper blade has reached a sliding rotation range from a wiping rotation range based on the drive of the blade rotating motor.

In accordance with a second aspect of the present invention, a method of wiping a windshield of a vehicle is provided, which comprises the steps of: providing a housing for supporting a slide bar in a slidable manner in a longitudinal direction of the slide bar, the slide bar having a wiper blade integrally formed thereon; unidirectionally rotating the housing by a motor; setting the housing such that the housing passes alternately through a wiping rotation range and a sliding rotation range two times each while the housing makes one full turn; and controlling the position of the slide bar toward one of the end of travel positions thereof during a period in which the housing is rotated from a starting end to a completing end of the wiping rotation range to perform wiping of the windshield by the wiper blade while causing the slide bar positioned toward the above one end of travel portion to slide toward the opposite end of travel position during the period in which the housing is rotated from a starting end to a completing end of the sliding rotation range to displace the wiper blade to a wiping position for the next cycle.

According to the construction as described above, the present invention makes possible wiping of the windshield without reversing the rotation of the wiper arm.

BRIEF DESCRIPTION OF THE DRAWINGS

The invention will be described with reference to the following figures, wherein:

FIG. 2A is a diagram showing the steps of FIG. 2.

DESCRIPTION OF THE PREFERRED EMBODIMENTS

Figure 1:
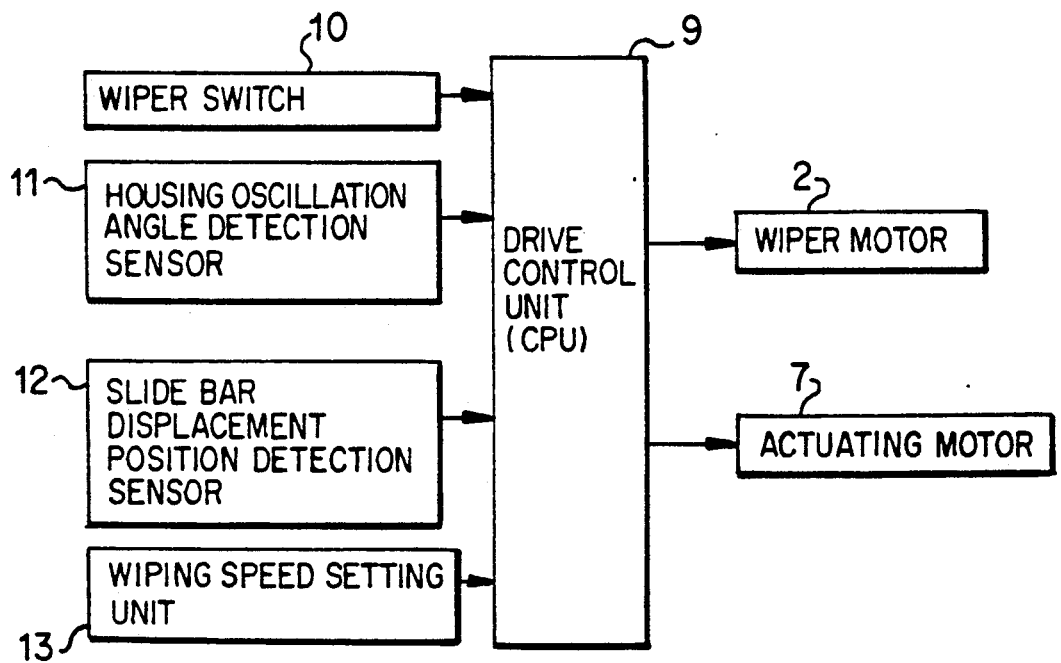
FIG. 1 is a block diagram showing a drive control mechanism of the present invention.

A specific embodiment of the present invention will now be described by way of the accompanying drawings. In the drawings, a wiper apparatus 1 embodying the present invention is shown. An output shaft 2a of a wiper motor 2 (corresponding to the "blade rotating motor" of the present invention) of the wiper apparatus 1 has a housing 3 integrally formed thereon so that the housing 3 is continually driven to be unidirectionally rotated by drive of the wiper motor 2.

A pair of support arms 3a are provided on the housing 3 with a predetermined separation. A slide bar 4 is supported on the pair of support arms 3a in an axial direction of the slide bar while rotation about the axis thereof is restricted. Known suitable methods such as a key-groove fitting method (as shown in the embodiment), a spline fitting method or a method in which the slide bar itself is formed into the shape of a square column may naturally be employed as the means for restricting the rotation of the slide bar 4 about the axis thereof. An attaching pin 4a projects at the lengthwise center portion of the slide bar 4, and the lengthwise center portion of the wiper blade 6 is attached to the attaching pin 4a in a manner sandwiching a pressing spring 5. The wiper blade 6 is thus forced against the windshield surface by the pressing spring 5. It should be noted that each support arm 3a has a notch 3b to avoid interference with the movement of the attaching pin 4a.

An actuating motor 7 (corresponding to the "blade moving motor" of the present invention) is internally provided on the housing 3. An output gear (pinion gear) 8 integrally provided on the output shaft 7a of the actuating motor 7 is meshed with a rack gear 4b which is carved on the slide bar 4. The slide bar 4 and wiper blade 6 are thus moved lengthwise of the bar by forward and reverse drive of the actuating motor 7 while the slide bar 4 is rotated about the axis of the motor shaft 2a by drive of the wiper motor 2.

A description will now be provided of the drive control procedure of the wiper motor 2 and the actuating motor 7. Specifically, these motors 2, 7 are constructed to be driven on the basis of control commands from a drive control unit (CPU) 9 which is formed of a microcomputer. The drive control unit 9 receives signals from various switches, sensors and setting units including: a wiper switch 10; a rotation angle detection sensor 11 for detecting the rotation angle of the housing 3 (i.e., rotation angle of the wiper blade 6); a displacement position detection sensor 12 for detecting the lengthwise displacement of the slide bar 4 (i.e., displacement of the wiper blade 6); and a wiping speed setting unit 13. Necessary drive command signals are then provided to the motors 2, 7 on the basis of these input signals. In this connection, the rotation angle of the housing 3 is determined by the rotation of the motor output shaft 2a. The rotation angle detection sensor 11 may thus comprise, for example, a rotation angle detection sensor for the motor output shaft 2a. Further, while a stroke sensor for detecting a change in length may be used as the displacement position detection sensor 12 for detecting the displacement of the slide bar 4 in the lengthwise direction thereof, the actuating motor 7 in the present embodiment is constructed to have a built-in encoder so that the displacement of the slide bar 4 is detected by the detection result of the encoder. These detection means may be composed of any actual means capable of detecting their respective objects.

Figure 2:
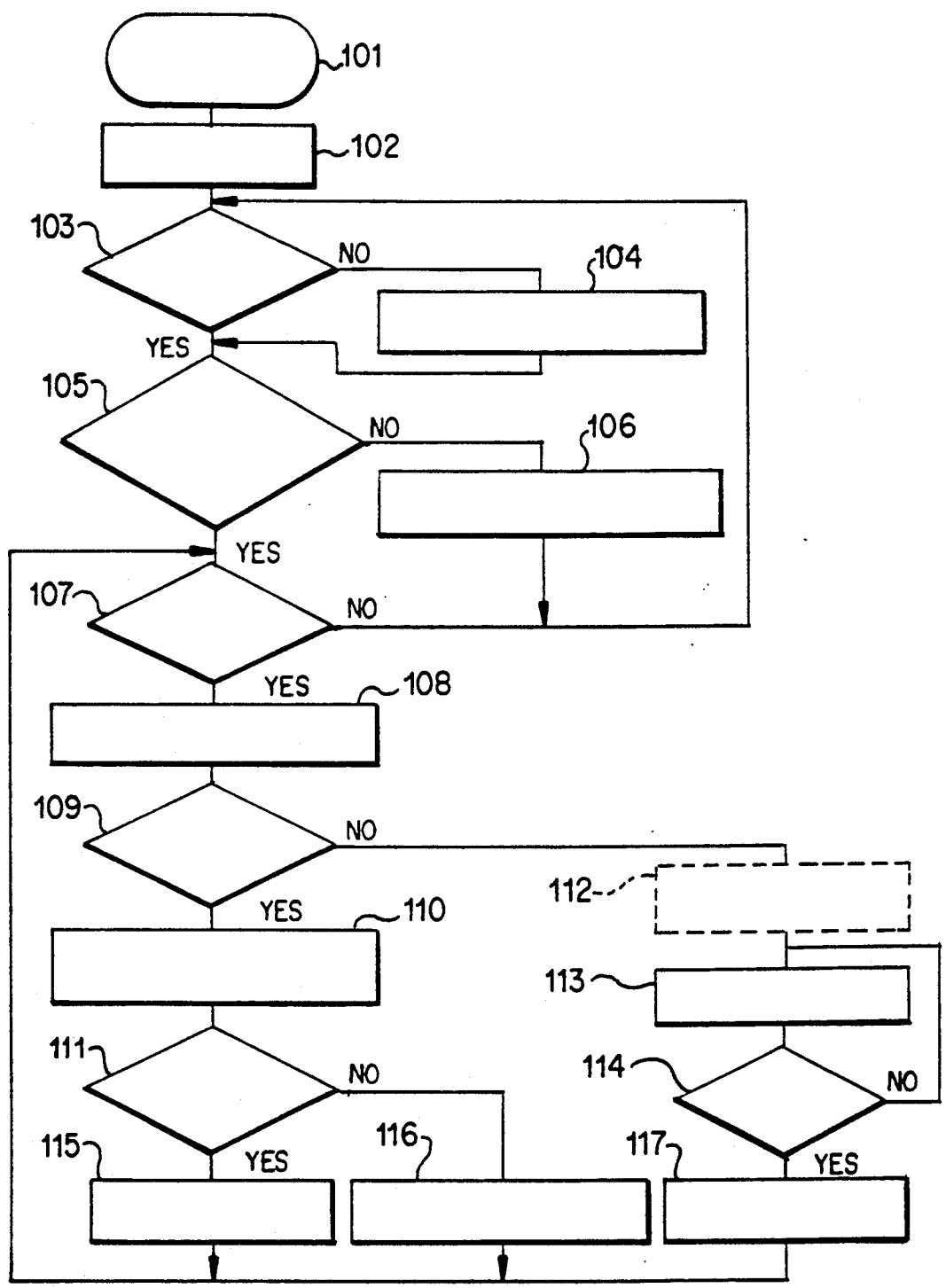
FIG. 2 is a flowchart showing the procedure for the drive control.

FIG. 2 is a flowchart showing an exemplary procedure of drive control of the motors 2, 7. For ease of description, the center of rotation of the housing 3, i.e., the position of the motor output shaft 2a in the present embodiment, is set to the exact center of the two support arms 3a. Further, the position of the motor output shaft 2a is set to the lower portion at the center with respect to the left and right directions of the windshield to be wiped. Based on the construction as described, it is thus convenient that a complete cycle of a geometrically congruent wiping operation is performed at each 180-degree rotation of the motor output shaft 2a. For convenience in the present embodiment, the turning range of 0°~150° of the above described 180-degree rotation range is determined as a wiping operation range and the turning range of 150°~180° thereof is determined as the range over which sliding is performed, i.e., a sliding rotation range.

In the present embodiment, the system is started when an engine key switch (not shown) is turned ON, whereby an initial setting operation is performed. An investigation is then made on the basis of the detected values of the two sensors 11, 12 as to whether the wiper blade 6 is positioned at the wiping start position of the wiping rotation range and at the same time whether the slide bar is positioned at one of the end of travel positions. If a judgment is made that the wiper blade 6 is not at the wiping start position and that the slide bar is not at one of the end of travel positions, drive control of the motors 2, 7 is performed to bring them to these positions. In this state, the system waits for turning ON of the wiper switch 10.

Figure 3A:
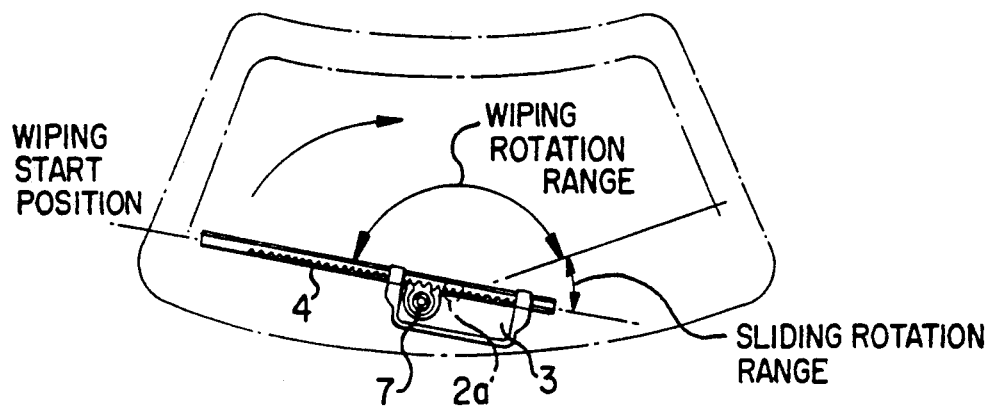
FIGS. 3A–3D are explanatory views of the movement operation of the wiper apparatus.

When the wiper switch 10 is turned ON in such a waiting state, a motor drive command set by the wiping speed setting unit 13 is provided from the drive control unit 9 to the wiper motor 2. The drive control unit 9 then determines whether the rotation angle detection sensor 11 is within the wiping rotation range of 0°~150° as shown in FIG. 3A and, if judged to be within the wiping rotation range, the drive control unit 9 furthermore calculates the displacement position of the wiper blade 6 based on the detected rotation angle of the rotation angle detection sensor 11. Such displacement position is calculated in the present embodiment in order to make the wiping region (locus) of the wiper blade 6 as large as possible. In other words, in order to make the wiping region (locus) of the wiper blade 6 a wider area, namely the widest wiping region (area), the locus of the end portion of the wiper blade 6 is, in the wiping process of the wiper blade 6 rotated by the wiper motor 2, set to navigate as adjacent as possible to the edge of the windshield instead of navigating a simple circular arc about the motor output shaft 2a. Accordingly, the displacement position of the wiper blade 6 provided by the actuating motor 7 is preset to assume the most preferable position (the position where the end portion of the wiper blade 6 is as adjacent as possible to the edge of the windshield, for example as shown in FIG. 3) corresponding to the rotating position (swinging position) of the wiper blade 6. Such a position is hereinafter referred to as the "set displacement position". The drive control unit 9 then determines whether or not the detected value of the displacement position detection sensor 12 coincides with the set displacement position and, if determined that there is no coincidence, drive control unit 9 renders a forward and reverse drive control of the actuating motor 7 so that the wiper blade 6 is positioned at the set displacement position.

Figure 3B:
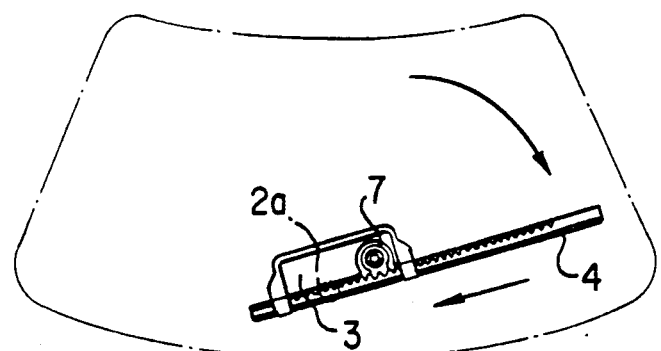
Figure 3C:
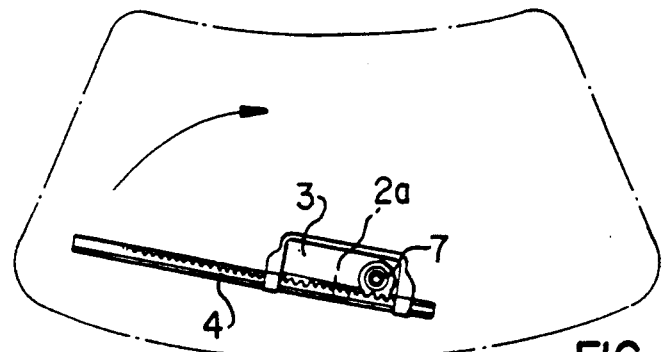

On the other hand, if it is determined that the wiper blade 6 has reached the sliding rotation range, as shown in FIG. 3B, the drive control unit 9 provides a drive control command to the actuating motor 7 so that the wiper blade 6 is slid to the end of travel position which is opposite to the end of travel position at which the wiper blade 6 is currently positioned and, if determined then that it has been moved to the opposite end of travel position, driving of the actuating motor 7 is terminated. In this construction, as shown in FIG. 3C, continued drive of the wiper motor 2 may be performed without causing any problem, if the movement of the wiper blade 6 toward the opposite end of travel position by drive of the actuating motor 7 can be set so that it is quickly performed during the period through which the wiper blade 6 is rotated from the starting end to the completing end of the sliding rotation range i.e., when the wiper blade 6 is rotated through the sliding rotation range from 150° to 180° (0°). If, however, the wiper motor 2 is continually driven such that movement is slower than the time period during which the wiper blade 6 is rotated through the sliding rotation range or where the sliding rotation range is very narrow, the wiper blade 6 may interfere with the windshield frame or it may extend beyond the windshield surface. In such a case, the wiper motor 2 is controlled to be stopped or slowed down as required, and the wiper blade 6 is slid toward the opposite end of travel position. Needless to say, it is then controlled to perform a wiping rotation of the next cycle.

In the state where the engine is running in the above embodiment of the present invention constructed as described, the wiper blade 6 is positioned at one of the end of travel positions and waits for the wiper switch 10 to be turned ON. When the wiper switch 10 is operated to be turned ON in this state, the wiper motor 2 is driven to cause the housing 3 to rotate unidirectionally.

Figure 3D:
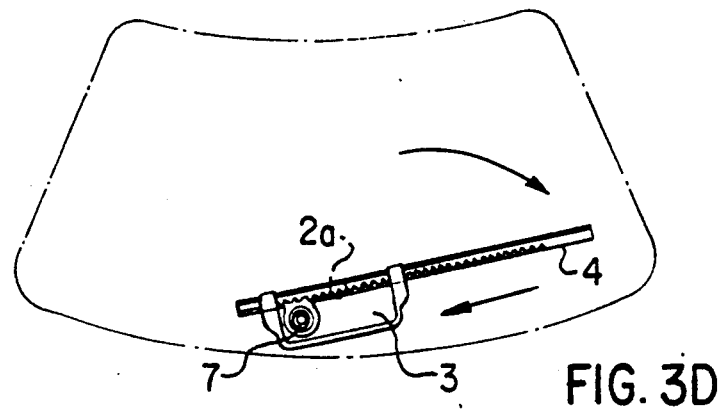
Figure 4A:
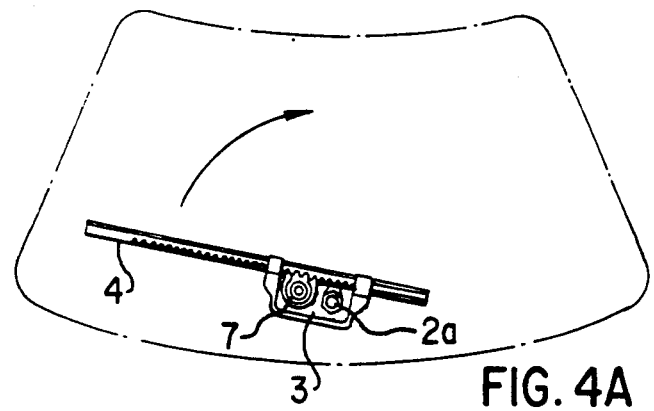
FIGS. 4A–4D are explanatory views of the movement operation of a wiper apparatus in another embodiment.
Figure 4B:
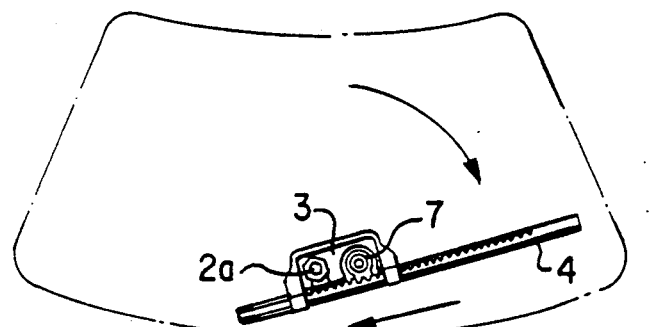
Figure 4C:
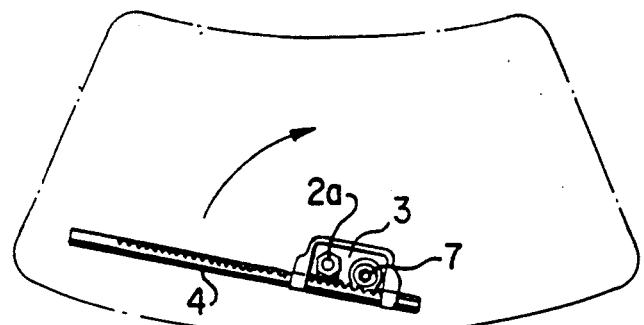
Figure 4D:
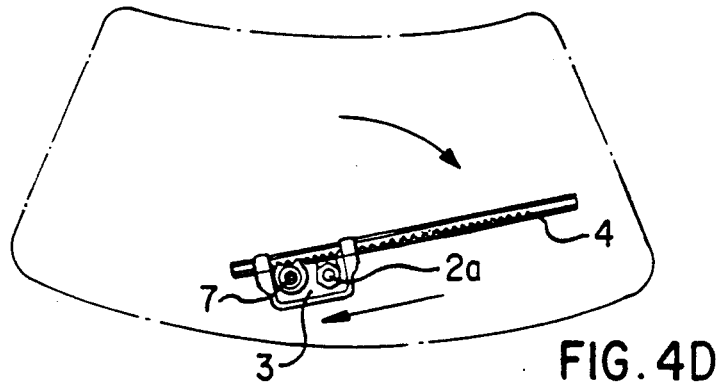
Figure 5:
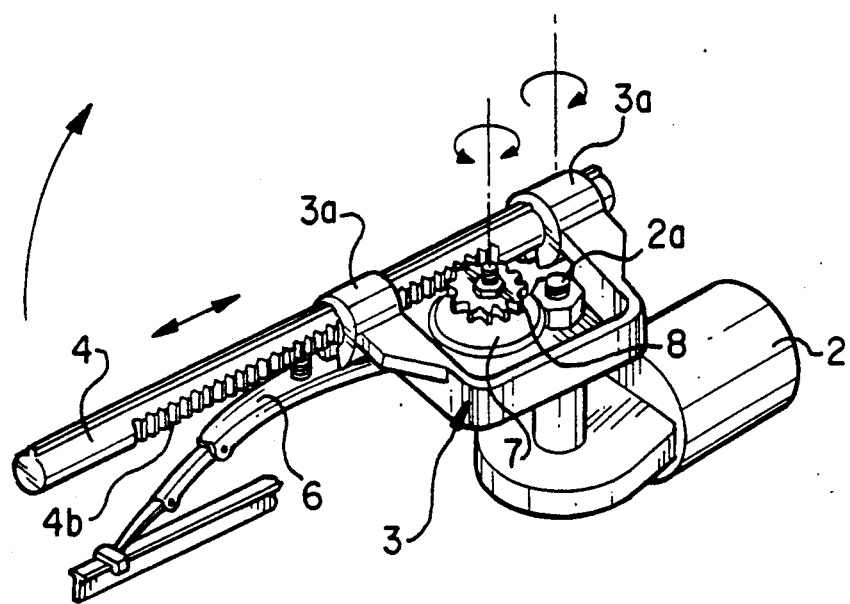
FIG. 5 is a perspective view of the above wiper apparatus.
Figure 6:
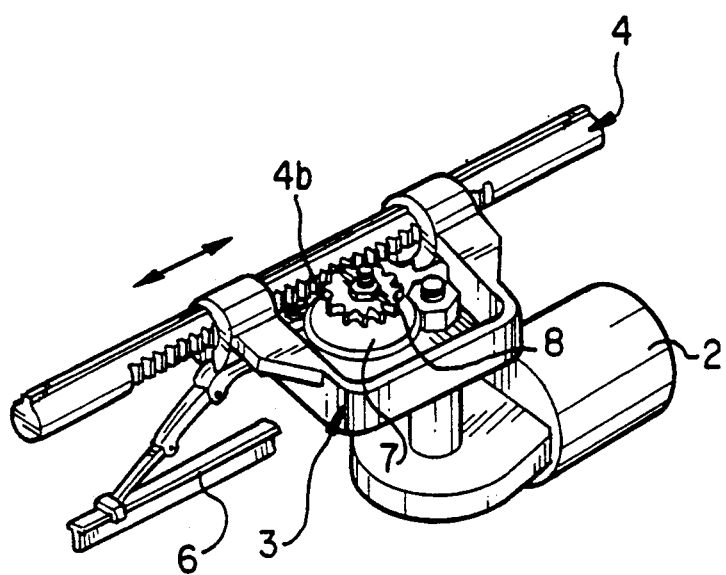
FIG. 6 is a perspective view of the same wiper apparatus showing the state where the slide bar is being moved.
Figure 7:
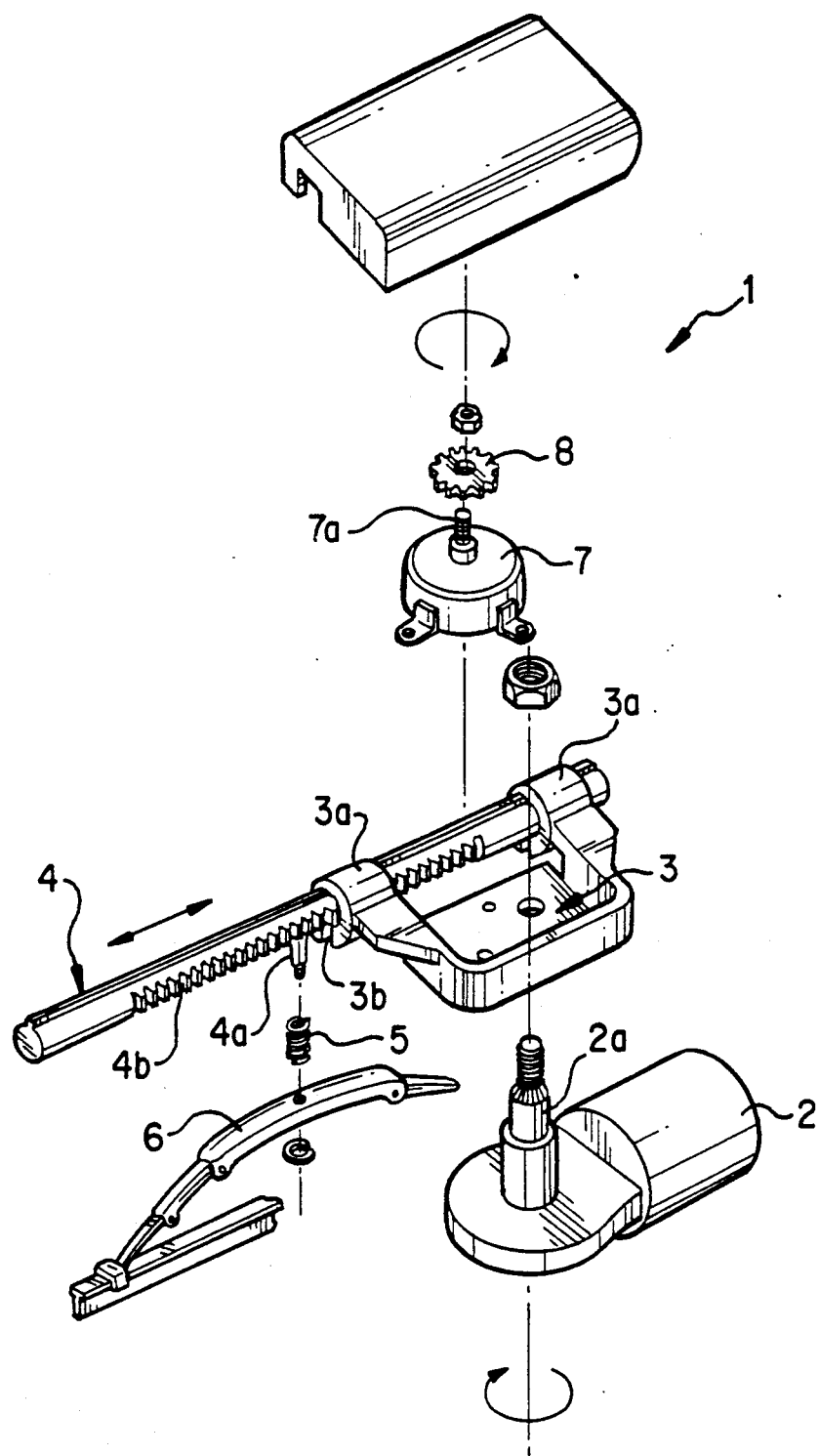
FIG. 7 is an exploded perspective view of the same wiper apparatus.
Figure 8:
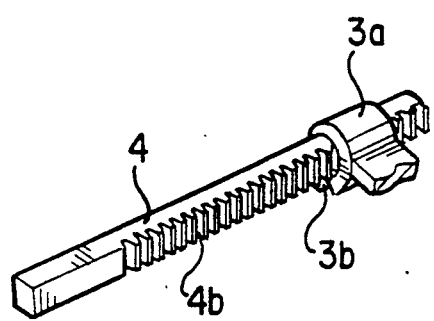
FIG. 8 is perspective view of a slide bar according to another embodiment.

In the course of such unidirectional rotation, the wiper blade 6 initially positioned at one of the end of travel positions performs wiping of the windshield surface during the wiping rotation range, and, during the sliding rotation range, as shown in FIG. 3D, the actuating motor 7 is driven to cause the wiper blade 6 to slide to the opposite end of travel position to prepare for the next cycle of wiping rotation.

As described, in the construction to which the present invention is applied, the wiper blade 6 for wiping the windshield surface, unlike that of the conventional construction, is not reversed and does not oscillate in a reciprocating manner. Wiping may be performed in the course of a unidirectional rotation of the housing 3 on which the wiper blade 6 is mounted. It thus does not receive the inertia at the time of reversing as an impact, whereby it is possible to perform a quiet and smooth wiping operation.

In addition, since, according to this construction, the wiper blade 6 is slid to the opposite end of travel position during the sliding rotation range, wiping of the windshield surface may be performed twice during one full turn of the housing 3, thereby it may be constructed to have a higher wiping ability. Moreover, since it is constructed such that the wiper blade 6 is slid toward the opposite end of travel position to complete one wiping process and to proceed to the next wiping process during a 180-degree rotation, there is no need for adopting an arrangement where the wiper motor 2 is positioned at the center of the window surface, obstructing the view through the window surface as is the case in a complete turn type (which is often provided on the window surface of a vessel) in which the wiper blade 6 is rotated through 360° about the motor shaft without any linear displacement. For example, it may be positioned below the windshield and may be used without any problem.

It should be noted that, naturally, the present invention is not limited to the embodiment as shown in the above described flowchart and, as shown in FIGS. 4A to 7, it may be embodied such that the position of motor output shaft 2a for rotation of the housing 3 by the wiper motor 2 is shifted from the center of the two support arms 3a. In such a construction, the position of the wiper blade 6 is different between the case where the housing 3 is rotated from its 0-degree position and the case where it is rotated from its 180-degree position. Control as described with respect to the previous embodiment causes a problem that the wiping rotation range by the wiper blade 6 is varied to be wider or narrower. To prevent this, a construction may be employed such that a detection and a determination are made as to whether the current wiping rotation is of a rotation started from the 0-degree position or of a rotation started from the 180-degree position, and the displacement position of the slide bar 4 is controlled to bring it to a position corresponding to each rotation.

Since the present invention is fundamentally constructed as has been described, the wiper blade 6 is slidably supported in a lengthwise direction thereof on a housing 3 which may be unidirectionally rotated based on drive of a blade rotating motor 2. In the course of such unidirectional rotation of the housing, the wiper blade positioned at one of the end of travel positions performs wiping of the windshield surface during a wiping rotation range while, during a sliding rotation range, a blade moving motor 7 is driven to cause the wiper blade 6 to move toward the opposite end of travel position so as to displace the wiper blade to its wiping position for the next cycle. As a result, unlike that of the conventional structure, the wiper blade 6 is not reversed and does not oscillate in a reciprocating manner. Accordingly, the wiping operation may be performed in the course of the unidirectional rotation of the housing on which the wiper blade is provided. Thus, in contrast to a wiper blade which is reversed and oscillates in a reciprocating manner, wiper blade 6 does not receive the inertia at the time of reversing as an impact. It is possible to perform a quiet and smooth wiping operation.

In addition, according to this construction, one wiping process is completed by a 180-degree rotation of the housing and the wiper blade is moved to the opposite end of travel position during the sliding rotation range thereof. Thus, wiping of a windshield surface may be performed twice during one full turn of the housing, whereby a high wiping ability may be achieved. Further, unlike a complete turn type in which the wiper blade is rotated 360° about the motor shaft without being linearly displaced, there is no need for adopting an arrangement where the motor is positioned at the center of the window surface, obstructing the view through the window surface. For example, it may be positioned below the windshield and may be used without causing any problem.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A wiper apparatus for a vehicle comprising:

an elongated slide bar having a wiper blade attached thereto;

a housing slidably supporting the slide bar for sliding displacement in a longitudinal direction of the slide bar, the slide bar having two longitudinally opposed end of travel positions each defining a wiping position of the wiper blade;

unidirectional blade rotating means coupled with said housing for unidirectionally rotating the housing through a rotational angle of 360° said unidirectional blade rotating means including a motor with an output shaft which supports said housing;

a blade moving motor mounted on the housing and coupled with the slide bar for forcibly sliding the slide bar to bring the wiper blade to the wiping positions;

rotation angle detection means for detecting a wiping rotation angle of the wiper blade;

displacement position detection means for detecting a longitudinal displacement position of the wiper blade; and drive control means connected to the rotation angle detection means and the displacement position detection means outputting a drive control command to the blade rotating motor to control the rotation of said slide bar and for outputting a slide control command to the blade moving motor, to control the displacement of said slide bar upon detection that the wiper blade has reached a sliding rotation range from a wiping rotation range;

wherein the blade moving motor causes the slide bar to slide to an opposite end of travel position upon receiving the slide control command.

2. The wiper apparatus according to claim 1, wherein the drive control unit controls the blade rotating motor such that the slide bar is slide to both of the end of travel positions without interfering with a windshield of the vehicle.

3. The wiper apparatus according to claim 1, wherein the wiping rotation range is substantially 0° to 150° of a 180° rotation of an output shaft of the blade rotating motor and the sliding rotation range is substantially 150° to 180° rotation of the output shaft of the blade rotating motor.

4. A wiper apparatus for a windshield of a vehicle, comprising:
 an elongated slide bar having a wiper blade attached thereto;
 a housing slidably supporting the slide bar for sliding displacement in a longitudinal direction of the slide bar, the slide bar having two longitudinally opposed end of travel positions each defining a wiper position of the wiper blade;
 unidirectional blade rotating means coupled with said housing for unidirectionally rotating said housing about a pivot axis through a rotational angle of 360°, said unidirectional blade rotating means including a motor with an output shaft which supports said housing;
 a blade moving motor mounted on the housing and coupled with the slide bar for sliding the slide bar to the end of travel positions;
 detection means for detecting an angular position of the housing about said axis and for detecting the slide bar displacement position; and
 drive control means coupled with said detection means for driving the blade rotating motor and the blade moving motor in response to the detected angular position of the housing and the slide bar displacement position.

5. The wiper apparatus according to claim 4, wherein said drive control means slides the slide bar to an opposed end of travel position when the detection means detects that the slide bar is positioned such that the wiper blade has reached a sliding rotation range at an end of a wiping rotation range.

6. The wiper apparatus according to claim 5, wherein the wiping rotation range is substantially 0° to 150° of a 180° rotation of an output shaft of the blade rotating motor and the sliding rotation range is substantially 150° to 180° of the 180° rotation of the output shaft of the blade rotating motor.

7. The wiper apparatus according to claim 4, wherein said detection means comprises:
 rotation angle detection means for detecting a wiping rotation angle of the wiper blade; and
 displacement position detection means for detecting a longitudinal displacement position of the wiper blade.

8. The wiper apparatus according to claim 7, wherein the drive control means is connected to the rotation angle detection means and the displacement position detection means, the drive control means driving the blade rotating motor and the blade moving motor based on the detected wiper blade rotation angle and the longitudinal displacement position.

* * * * *